United States Patent [19]

Gordon et al.

[11] 4,107,390
[45] Aug. 15, 1978

[54] RADIATION-CURABLE ORGANOPOLYSILOXANE COATING COMPOSITION COMPRISING MERCAPTOALKYL AND SILACYCLOPENTENYL RADICALS, METHOD OF COATING AND ARTICLE THEREFROM

[75] Inventors: David J. Gordon, Essexville; Maris J. Ziemelis, Midland, both of Mich.

[73] Assignee: Dow Corning Corporation, Midland, Mich.

[21] Appl. No.: 856,693

[22] Filed: Dec. 2, 1977

[51] Int. Cl.$^2$ ............................ B32B 9/04; B05D 3/06
[52] U.S. Cl. ................................ 428/447; 204/159.13; 260/827; 427/36; 427/44; 427/54; 428/452; 428/537
[58] Field of Search ............... 204/159.13; 427/36, 427/44, 54; 428/447, 537, 452; 260/827

[56] References Cited

U.S. PATENT DOCUMENTS

| 3,328,482 | 6/1967 | Northrup et al. ............... 260/825 |
| 3,509,191 | 4/1970 | Atwell ............................ 260/37 SB X |
| 3,655,713 | 4/1972 | Le Grow ........................ 204/159.13 X |
| 3,726,710 | 4/1973 | Berger et al. .................. 204/159.13 X |
| 3,816,164 | 6/1974 | Pepe et al. ..................... 428/447 |
| 3,816,282 | 6/1974 | Viventi ........................... 204/159.13 |
| 3,873,499 | 3/1965 | Michael et al. ................. 260/46.5 E |
| 4,035,453 | 7/1977 | Hittmair et al. ................ 260/827 X |
| 4,052,529 | 10/1977 | Bokerman et al. ............. 428/537 |

FOREIGN PATENT DOCUMENTS

| 653,301 | 12/1962 | Canada. |
| 2,008,426 | 9/1970 | Fed. Rep. of Germany. |
| 1,409,223 | 10/1975 | United Kingdom. |
| 1,433,461 | 4/1976 | United Kingdom. |

*Primary Examiner*—Ronald H. Smith
*Assistant Examiner*—Thurman K. Page
*Attorney, Agent, or Firm*—George A. Grindahl

[57] ABSTRACT

Radiation-curable compositions consisting essentially of a triorganosiloxane-endblocked polydiorganosiloxane fluid bearing a small percentage of mercaptoalkyl radicals and a curing agent comprising a 1,1'-oxy-bis-(1-methyl-1-silacyclopentene) are disclosed. When applied to a substrate and exposed to energetic radiation these compositions rapidly cured to provide a coating on the substrate that releases aggressive adhesives. Advantageously, the coating, when cured with ultraviolet light in air, is essentially free of the obnoxious odor which characterizes the analogous compositions of the art which are cured with only polymethylvinylsiloxane as a curing agent.

15 Claims, No Drawings

RADIATION-CURABLE ORGANOPOLYSILOXANE COATING COMPOSITION COMPRISING MERCAPTOALKYL AND SILACYCLOPENTENYL RADICALS, METHOD OF COATING AND ARTICLE THEREFROM

BACKGROUND OF THE INVENTION

This invention relates to radiation-curable organopolysiloxane compositions, to their use in a coating method and to an article produced by said method. In one aspect this invention relates to radiation-curable, mercaptopropyl-containing polydiorganosiloxane compositions which have an improved curing odor, to a method of coating and curing said composition onto a substrate and to a coated substrate obtained therefrom.

In the pressure sensitive adhesive art it is often desirable to prepare an adhesive-bearing article such as a label or a tape and to store the article for some time before use. In the storing process the adhesive-bearing article is conveniently adhered to an intermediate surface from which it must be easily removed before use. For example, said tape may be wound in a coil whereby the adhesive surface of one turn of the tape is adhered to the non-adhesive surface of the previous turn of the tape. Preferential release of the upper turn of tape with its adhesive from the previous turn is needed to unwind and use the tape. In another example, adhesive-bearing labels are frequently supplied with a protective paper over the adhesive, which paper must be removable from the adhesive before the label is applied in its intended use.

Polyorganosiloxanes have been used for a long time to coat solid substrates, such as paper, to improve the release of adhesive materials therefrom. As the adhesive properties and holding power of adhesive materials have improved, the need for improved release coatings has increased. Improved release coatings have also been required by other factors such as increasing environmental concerns, a desire for faster coating and curing processes, and a need to lower process energy costs. Solventless, radiation-curable coatings have thus been sought to meet these needs.

Radiation-curable organopolysiloxane compositions bearing mercaptoorgano radicals are known broadly from Warrick, Canadian Pat. No. 653,301; Berger, et al., U.S. Pat. No. 3,726,710 and Viventi, U.S. Pat. No. 3,816,282; however, it is the disclosures of Michael, et al. U.S. Pat. No. 3,873,499; Gant, British Pat. No. 1,409,223; and Bokerman, et al. U.S. Pat. No. 4,052,529 relating to radiation-curable coating compositions comprising an organopolysiloxane bearing mercaptoorgano radicals and a polymethylvinylsiloxane curing agent that are of interest. Because of the presence of a curing odor, which develops during ultraviolet light curing in air, said compositions comprising a mercaptopropyl-substituted polydiorganosiloxane and a polymethylvinylsiloxane curing agent have met some resistance to being accepted in the marketplace.

By curing odor it is meant herein an odor which emanates from the cured composition after the radiation-curable composition has been applied to a substrate and has been exposed to ultraviolet light in an oxygen-containing atmosphere, such as air, to effect the curing process. This curing odor, which may persist for minutes or hours after the curing is completed, has been described by some observers as a sour odor or as a mercaptan-like odor. This odor is very noticeable, especially when the radiation-curable composition is used in thin layer applications, such as in a paper-coating process.

SUMMARY OF THE INVENTION

It is thus an object of the present invention to provide a radiation-curable, mercaptopropyl-containing organopolysiloxane composition which has an improved curing odor compared to analogous compositions of the art having only a polymethylvinylsiloxane as a curing agent.

It is another object of this invention to provide an improved method for coating a substrate with a mercaptopropyl-containing organopolysiloxane wherein a less-unpleasant curing odor is produced compared to analogous state-of-the-art processes.

It is also an object of this invention to provide a substrate coated with a cured organopolysiloxane composition.

It is a further object of this invention to provide new radiation-curable organopolysiloxane compositions.

It is an additional object of this invention to provide a new method for coating a substrate with an organopolysiloxane composition.

In accordance with this invention, these and other objects are obtained by substituting, in a composition of the art consisting essentially of an organopolysiloxane polymer bearing silicon-bonded mercaptoalkyl radicals and a polymethylvinylsiloxane curing agent, an equivalent amount of 1,1'-oxy-bis(1-methyl-1-silacyclopentene) for a portion of the polymethylvinylsiloxane curing agent. The resulting composition of this invention has the same utility as said composition of the art; but, when the mercaptoalkyl radicals are mercaptopropyl it has the additional benefit of having an improved curing odor when at least half, and preferably all, of the polymethylvinylsiloxane is replaced with an equivalent amount of 1,1'-oxy-bis(1-methyl-1-silacyclopentene). By an equivalent amount of 1,1'-oxy-bis(1-methyl-1-silacyclopentene) it is meant an amount that will provide the same number of aliphatic carbon-carbon double bonds as was contained in the replaced polymethylvinylsiloxane. For example, two mols of 1,1'-oxy-bis(1-methyl-1-silacyclopentene) having a total of 4 mols of 1-methyl-1-silacyclopentenyl radicals is equivalent to 1 mol of tetramethyltetravinylcyclotetrasiloxane having 4 mols of vinyl radicals.

It was unexpected to find that 1,1'-oxy-bis(1-methyl-1-silacyclopentene), a molecule bearing only two sites of aliphatic unsaturation, may be used as a curing agent, in place of a polymethylvinylsiloxane bearing three or more vinyl groups per molecule in a radiation-curable organopolysiloxane coating composition, without greatly altering the cure rate of the curable composition or the release properties of the cured release coating obtained therefrom.

It was also unexpected to find that the curing odor of radiation-curable organopolysiloxane compositions bearing mercaptopropyl radicals and vinyl radicals was improved by using 1,1'-oxy-bis(1-methyl-1-silacyclopentene) in place of at least half of a polymethylvinylsiloxane as the curing agent.

DESCRIPTION OF THE INVENTION

This invention relates to a radiation-curable polydiorganosiloxane composition obtained by mixing components consisting essentially of (A) a triorganosiloxane-endblocked polydiorganosiloxane fluid having a viscosity of at least 0.5 pascal-seconds at 25° C., wherein from 50 to 99 percent of all organic radicals are methyl, from 1 to 5 percent of all organic radicals are mercaptoalkyl having the formula —$(CH_2)_nSH$, wherein $n$ has a value of from 1 to 4 inclusive, any remaining organic radicals in (A) being phenyl radicals or alkyl radicals having from 2 to 6, inclusive, carbon atoms, (B) a polymethylvinylsiloxane compatible with (A) and having an average of at least three vinyl groups per molecule, and (C) 1,1'-oxy-bis(1-methyl-1-silacyclopentene), the amounts of (A), (B), and (C) being sufficient to provide (i) a total of from 0.2 to 2.0 silicon-bonded aliphatically unsaturated radicals for every silicon-bonded mercaptoalkyl radical in the composition and (ii) a molar ratio of silicon-bonded vinyl radicals to 1-methyl-1-silacyclopentenyl radicals of from 0 to 1.0.

This invention also relates to a method of treating a solid substrate to improve the release of adhesive materials therefrom, and the treated substrate obtained thereby, said method comprising (I) applying to the substrate the radiation-curable polyorganosiloxane composition obtained by mixing components consisting essentially of (A), (B), and (C) in the proper proportions, as hereinabove stated, (II) exposing the applied mixture to energetic radiation thereby curing the applied composition and (III) recovering an article comprising the substrate having adhered thereto a cured polydiorganosiloxane that will provide release of adhesives therefrom.

Component (A) is any triorganosiloxane-endblocked polydiorganosiloxane of the formula $R_3SiO(R_2SiO)_q SiR_3$ wherein the value of $q$ is such that the viscosity of the polydiorganosiloxane has a value of at least 500 centipoise (0.5 pascal-seconds) at 25° C. Fluids wherein R is limited to methyl radicals and small amounts of mercaptopropyl radicals have a value for $q$ of at least approximately 150 to provide a viscosity of at least approximately 0.5 Pa·s. Each R radical may be, independently, an alkyl radical of from 1 to 6 carbon atoms, such as methyl, ethyl, isopropyl, butyl, pentyl, and hexyl; a phenyl radical or a mercaptoalkyl radical. Mercaptoalkyl radicals have the formula —$(CH_2)_nSH$, wherein $n$ has a value of from 1 to 4, such as —$CH_2SH$, —$CH_2CH_2SH$, —$CH_2CH_2CH_2SH$ and —$CH_2CH_2CH_2CH_2SH$. Mercaptopropyl radicals are preferred because of synthesis and odor considerations. That is, polydiorganosiloxanes bearing mercaptopropyl radicals are more conveniently synthesized and/or have a more acceptable odor in the uncured state than polydiorganosiloxanes bearing other mercaptoalkyl radicals.

From 50 to 99 percent, preferably from 95 to 99 percent, of all R radicals in the polydiorganosiloxane (A) are the methyl radical. It is preferred that each silicon atom in (A) have at least one silicon-bonded methyl radical. Preferably the number of phenyl radicals is limited to from 0 to 5 percent of all R radicals since the cure rate of radiation-curable compositions is retarded by the presence of phenyl radicals. From 1 to 5 percent of all R radicals are mercaptoalkyl radicals. Mercaptoalkyl radicals may be bonded to any of the silicon atoms in (A) but it is preferred that a majority of mercaptoalkyl radicals are non-terminal, i.e. are bonded to non-terminal silicon atoms.

Triorganosiloxane-endblocked polydiorganosiloxanes that are preferred as component (A) therefore have two methyldiorganosiloxane endblocking units per molecule, such as $(CH_3)_3SiO_{1/2}$, $(CH_3)_2(HSCH_2CH_2CH_2)SiO_{1/2}$ and $C_6H_5(CH_3)_2SiO_{1/2}$, and a plurality of methylorganosiloxane units, such as $(CH_3)_2SiO$, $CH_3(CH_3CH_2)SiO$ and methylmercaptoalkylsiloxane units, such as $CH_3(HSCH_2CH_2)SiO$ and $CH_3(HSCH_2CH_2CH_2)SiO$ forming the polymer chain. A polydiorganosiloxane consisting of $(CH_3)_3SiO_{1/2}$ units, $(CH_3)_2SiO$ units and $CH_3(HSCH_2CH_2CH_2)SiO$ units is highly preferred in adhesive release coatings. While polydiorganosiloxane (A) is described as consisting of triorganosiloxane units and diorganosiloxane units, it is to be understood that there can be in (A) small amounts of $SiO_{4/2}$ units and $RSiO_{3/2}$ units, wherein R is as defined above, that are normally present as impurity units in commercial polydiorganosiloxanes.

The number of mercaptoalkyl radicals that are present in the triorganosiloxane-endblocked polydiorganosiloxane may be determined by any suitable analytical method such as elemental analysis, spectroscopic analysis such as nuclear magnetic resonance, and functional group analysis such as sulfhydryl analysis and siloxane unit analysis.

A convenient analytical method that may be used to determine the number of mercaptoalkyl radicals in (A), and which is illustrated in the Examples, comprises dissolving a known weight of (A) in a mixture of toluene, dimethylsulfoxide and water and titrating the resulting solution with a standardized solution of iodine in ethanol. The amount of iodine that is needed to impart a lasting color to the sample is noted and the weight percent of sulfhydryl radicals is calculated using the following equation:

$$\text{Weight percent SH} = \frac{\text{ml. of titer} \times \text{normality of } I_2 \times 33.06}{10 \times \text{grams of sample}}$$

The viscosity of component (A) should have a value of at least 0.5 pascal-seconds (Pa·s) at 25° C. so that the mixture of (A) plus (B) plus (C) will have a viscosity such that the mixture can be conveniently applied to a substrate and cured. There is no known upper limit for the value of the viscosity of (A); however, the viscosity of the mixture of (A), (B), and (C) should be sufficiently low so that said mixture can be readily applied to the substrate. For general applications a practical upper limit for the viscosity of the mixture of (A), (B), and (C) is approximately 100 Pa·s. For paper coating applications, a preferred upper limit for the viscosity of a mixture of (A), (B), and (C) is approximately 10 Pa·s. If the viscosity of the mixture of (A), (B), and (C) is undesirably high, water or any common volatile organic liquid, such as benzene, toluene, methylene chloride or cyclohexane can be admixed with the mixture to dissolve, disperse or suspend the mixture and thereby reduce its viscosity to a value of no more than 100 Pa·s at 25° C., preferably no more than 10 Pa·s at 25° C. for paper coating applications. Preferably component (A) has a viscosity of from 0.5 to 100 Pa·s at 25° C. for general applications and a viscosity of from 0.5 to 10 Pa·s at 25° C. for paper coating applications thereby rendering the use of water or organic liquids in this invention unnecessary.

Component (A) may be prepared by any suitable method that can be used for the preparation of triorganosiloxane-endblocked polydiorganosiloxane bearing mercaptoalkyl radicals. For example, a silane bearing silicon-bonded hydrolyzable radicals and at least one mercaptoalkyl radical, such as (HSCH$_2$CH$_2$CH$_2$)(CH$_3$)Si(OCH$_3$)$_2$ may be hydrolyzed and condensed to prepare a mixture of cyclic and silanol-endblocked linear polyorganomercaptoalkylsiloxanes which may then be mixed with an appropriate amount of a suitable cyclopolydiorganosiloxane such as cyclopolydimethylsiloxane, an appropriate amount of a suitable endblocking source such as triorganosiloxane-endblocked siloxane such as decamethyltetrasiloxane and hexamethyldisiloxane and an acid catalyst such as CF$_3$SO$_3$H and the mixture equilibrated by heating for from 3 to 8 hours. Alternately, a sulfur-free triorganosiloxane-endblocked polydiorganosiloxane containing suitable R radicals and suitably reactive radicals, such as silicon-bonded-hydrogen, -chloropropyl and -olefin, such as vinyl or -allyl, radicals may be reacted with an appropriate sulfur-containing material such as allyl mercaptan, NaSH and H$_2$S, respectively using well-known reaction schemes. Other methods for preparing component (A) will be obvious to one skilled in the silicone polymer art.

Component (B) is any polymethylvinylsiloxane which is compatible with component (A) and which has at least three silicon-bonded vinyl radicals per molecule. By the term polymethylvinylsiloxane it is meant that essentially all of the siloxane units of the polysiloxane are methylvinylsiloxane units; however, minor amounts of other siloxane units such as (CH$_3$)$_2$SiO, (CH$_3$)$_3$SiO$_{1/2}$, (C$_6$H$_5$)(CH$_3$)(CH$_2$=CH)SiO$_{1/2}$, CH$_3$SiO$_{3/2}$, CH$_2$=CHSiO$_{3/2}$, (HO)(CH$_3$)(CH$_2$=CH)SiO$_{1/2}$ and (HO)(CH$_3$)$_2$SiO$_{1/2}$ may be present without departing from the spirit of this invention.

Component (B) may be cyclic, linear or branched as long as it is compatible with (A). For example, component (B) may be a cyclopolymethylvinylsiloxane or an endblocked polymethylvinylsiloxane such as a hydroxy-endblocked polymethylvinylsiloxane or a triorganosiloxane-endblocked polymethylvinylsiloxane such as (CH$_3$)$_3$SiO{CH$_3$(CH$_2$=CH)SiO}$_x$Si(CH$_3$)$_3$ and (CH$_3$)$_3$SiO{CH$_3$(CH$_2$=CH)SiO}$_x$Si(CH$_3$)$_2$(CH=CH$_2$). Furthermore, component (B) may be a single polymethylvinylsiloxane or a mixture of polymethylvinylsiloxanes such as a mixture of linear and cyclic polymethylvinylsiloxanes.

Component (B) is preferably a cyclopolymethylvinylsiloxane having from 3 to 10 silicon atoms per molecule. Furthermore, the cyclopolymethylvinylsiloxane may be a single cyclopolymethylvinylsiloxane, such as a cyclomethylvinyltetrasiloxane or it may be a mixture of two or more cyclopolymethylvinylsiloxanes. Most preferably, component (B) is a cyclopolymethylvinylsiloxane having the formula {CH$_3$(CH$_2$=CH)SiO}$_z$. Herein z has a value of from 3 to 10 inclusive.

Polymethylvinylsiloxanes are well known in the organosilicon art. They may be prepared by any suitable method for the preparation of polydiorganosiloxanes. A preferred method is to hydrolyze methylvinyldichlorosilane and distill the volatile cyclopolymethylvinylsiloxanes. The addition of suitable endblocking species such as trimethylchlorosilane to the mixture to be hydrolyzed will result in endblocked linear polymethylvinylsiloxanes which may also be distilled if desired.

Component (C) is any 1,1'-oxy-bis(1-methyl-1-silacyclopentene). It is to be understood that this nomenclature for component (C), which does not designate the position of the carbon-carbon double bond in the silacyclopentene rings, is used herein to designate any of the 3 isomeric disilyl ethers, i.e. 1,1'-oxy-bis(1-methyl-1-silacyclopentene-2) or 1,1'-oxy-bis(1-methyl-1-silacyclopentene-3) or 1-(1-methyl-1-silacyclopentenyl-2)-1'(1-methyl-1-silacyclopentenyl-3) ether or any mixture of two or more of said isomers. Each of said isomers provides two 1-methyl-1-silacyclopentenyl radicals per molecule in the compositions of this invention.

Component (C), and its preparation, is disclosed by Atwell, U.S. Pat. No. 3,509,191 which is hereby incorporated herein by reference to show a preparation of component (C). Briefly, a hydrolyzable 1-methyl-1-silacyclopentenyl compound, such as 1-methoxy-1-methyl-1-silacyclopentene, either the -2 isomer or the -3 isomer or a mixture of these isomers, may be hydrolyzed and condensed, presumably via an intermediate silanol, to yield the corresponding disilyl ether. For example, Atwell hydrolyzed 100 grams of 1-chloro-1-methyl-1-silacyclopentene-3 with 500 grams of water containing 70 grams of NaHCO$_3$ to produce a hydrolyzate which was distilled at reduced pressure to provide the disilyl ether 1,1'-oxy-bis(1-methyl-1-silacyclopentene-3).

In the composition of this invention or the method of this invention component (c) may thus be a single isomer of 1,1'-oxy-bis(1-methyl-1-silacyclopentene) hereinbefore described, i.e. any of

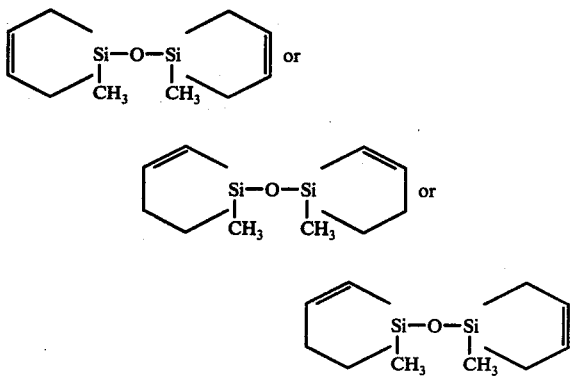

or any mixture of two or more of said isomers. Conveniently, component (C) is a mixture of said isomers which is obtained from the hydrolysis and random condensation of a mixture of 1-chloro-1-methyl-1-silacyclopentene-2 and 1-chloro-1-methyl-1-silacyclopentene-3. Such a mixture of isomeric silacyclopentenes is the usual product of a reaction of 1,3-butadiene with methylchlorodisilanes such as (CH$_3$)$_3$Si$_2$Cl$_3$ or a mixture of (CH$_3$)$_2$Si$_2$Cl$_4$ and (CH$_3$)$_3$Si$_2$Cl$_3$ as disclosed by Atwell.

Components (A), (B), and (C) are mixed in sufficient amounts so that, in the compositions of this invention, the ratio of the total number of aliphatically unsaturated radicals in (B) plus (C) to the total number of mercaptoalkyl radicals in (A) has a value of from 0.2 to 2.0 inclusive and the ratio of the total number of vinyl radicals in (B) to the total number of 1-methyl-1-silacyclopentenyl radicals in (C) has a value of from 0 to 1.0 inclusive. By aliphatically unsaturated radicals it is meant the silicon-bonded vinyl radicals in component (B) and the 1-methyl-1-silacyclopentenyl radicals in component (C) represented by the formulae

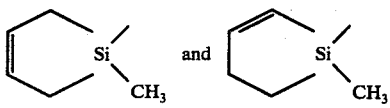

wherein the undesignated silicon valence is satisfied in (C) by one bond of divalent oxygen.

Mixtures of (A), (B), and (C) wherein the ratio of vinyl radicals in (B) to 1-methyl-1-silacyclopentenyl radicals in (C) has a value of greater than 1.0 have been shown to be useful radiation-curable coating compositions; however, a noticeable reduction of curing odor in such compositions is not obtained and there is no advantage, over the compositions of the art, in mixing such compositions having ratios of vinyl radicals to 1-methyl-1-silacyclopentenyl radicals greater than 1.0.

A preferred composition of this invention is one wherein all mercaptoalkyl radicals are mercaptopropyl radicals and the ratio of vinyl radicals to 1-methyl-1-silacyclopentenyl radicals has a value of zero, i.e. a composition which is free of polymethylvinylsiloxane (B). This preferred composition is essentially free of the unpleasant curing odor which is characteristic of the compositions of the art, as hereinbefore noted, and yet it can be rapidly cured with ultraviolet light. Furthermore when applied to a substrate, such as paper, said composition surprisingly provides a release coating for adhesives which is nearly equivalent to the polymethylvinylsiloxane-cured compositions of the art in adhesive release.

While mixtures of (A) and (C) wherein the ratio of 1-methyl-1-silacyclopentenyl radicals in (C) to mercaptoalkyl radicals in (A) has a value as high as 2.0 are useful as radiation-curable organopolysiloxane compositions, compositions wherein said ratio exceeds 1.0 are not preferred since they produce cured coatings possessing a slower cure rate and high release values of certain adhesives and are therefore less desirable as a release coating.

A highly preferred composition of this invention is a preferred composition, hereinabove described wherein the ratio of 1-methyl-1-silacyclopentenyl radicals to mercaptopropyl radicals therein has a value of approximately 0.5. Such a composition produces no curing odor, hereinabove defined, and can be cured rapidly as a paper coating to provide premium release of aggressive acrylic adhesives. A coating is considered to provide premium release if a force of not more than 100 grams per inch (38.61 newtons per meter), as measured by the method hereinafter described, is needed to remove the adhesive from the coating. An aggressive adhesive is a material that requires a force of at least 460 newtons/meter (N/m) to remove the adhesive from a stainless steel mirror surface using said method of measuring.

The compositions of this invention are prepared by mixing the triorganosiloxane-endblocked polydiorganosiloxane (A) with appropriate amounts of the polymethylvinylsiloxane (B) and 1,1'-oxy-bis(1-methyl-1-silacyclopentene) (C) in any suitable manner such as blending, stirring, milling and tumbling. Although not required, the use of solvents and/or mild heat to aid this mixing process is permissible. Any solvents that are used in the mixing process may be removed before or after the compositions of this invention are applied to a substrate.

The compositions of this invention may also contain ingredients that are common to radiation-curable compositions such as photosensitizers and gelation inhibitors. An effective amount of said ingredients may be determined by simple experimentation.

A radiation-curable composition is more useful if it does not cure or gel at room temperature for a period of at least 8 hours, preferably for at least 24 hours, after being prepared. The compositions of this invention have been found to be free or gelation for more than 24 hours at room temperature in the absence of radiation. However, in certain instances, it may be desired to assure that no gelation occurs over a period of days or weeks. To this end a gelation inhibitor may be admixed with the compositions of this invention at any time prior to curing or gelation of the composition. Any suitable gelation inhibitor may be used in the compositions of this invention, but the best inhibitors known to the inventors at this time are dihydric phenols and their alkylated derivatives. More particularly, the inhibitors are pyrocatechol or hydroquinone or monoethers thereof or alkyl-substituted hydroquinone or pyrocatechol or monoethers thereof. These materials are described in "Stabilization of Polymers and Stabilizers Processes," a publication of the American Chemical Society, 1969. These inhibitors are effective in concentrations as low as approximately 50 parts per million parts of (A) plus (B) plus (C), on a weight basis.

To increase the rate of cure of the compositions of this invention under the action of ultraviolet light it is desirable to use an effective amount of a photosensitizer. Any suitable photosensitizer may be used such as the wellknown aromatic ketones such as acetophenone, benzophenone, dibenzosuberone and benzoin ethyl ether and azo compounds such as azobisisobutyronitrile. Any suitable photosensitizer may be admixed with the compositions of this invention at any time prior to the curing of said compositions. These compounds are effective as photosensitizers in concentrations as low as approximately 500 parts by weight for every one million parts by weight of (A) plus (B) plus (C).

The compositions of this invention may contain other non-essential ingredients such as pigments and rheology control additives which will not interfere significantly with the radiation cure of the composition.

A preferred manner of practicing this invention is to prepare a two-package composition; one package comprising the triorganosiloxane-endblocked polydiorganosiloxane bearing mercaptoalkyl radicals and the other package comprising the aliphatically unsaturated curing agent. Any additional components may be included in either of the two packages as desired. When a radiation-curable composition of this invention is desired the appropriate amounts of each package may be mixed to form the composition of this invention and the composition promptly used. This manner of practicing the invention thus permits premeasured quantities of the desired components to be packaged and stored for months before use without experiencing any gelation of the individual components.

The compositions of this invention are useful as radiation-curable paint additives, coil coatings, textile treatments, water-repellant coatings, inks and the like, as well as radiation-curable release coatings.

The compositions of this invention may be applied to and cured on any suitable solid substrate such as cellulosic materials such as paper and wood; metals such as aluminum, iron and steel; plastics such as polyethylene or polypropylene films or sheets, polyethylene or polypropylene films on other surfaces such as on paper, polyamides such as nylon and polyesters such as Mylar®, (registered trademark of E.I. DuPont de Nemours, Wilmington, Delaware); and siliceous materials such as ceramics, glass and concrete.

The compositions of this invention are particularly useful as adhesive release coatings on paper or plastic coated paper. Said compositions may be applied in a thin layer to the surface of paper to provide a coating with a mass of approximately one gram per square meter of coated paper. In the cured form these thin coatings will provide improved release of adhesives as measured by the method hereinafter described. It is to be understood that said coatings may also be applied in thinner or thicker layers as long as the radiation cure of the coating is not impaired. In the paper release coating art the amount of release coating will generally vary from approximately 0.1 to 2.0 grams per square meter.

In the method of this invention the compositions of this invention are applied to a substrate by any suitable method such as brushing, dipping, spraying, rolling and spreading. Application of said compositions to paper may be done by any of the suitable methods that are well-known in the paper coatings art such as by trailing blade coater, by an air knife, by kiss rolls, by gravure rolls, by printing or by any other known method. The compositions of this invention may be applied to the entire surface of a substrate or to any portion thereof, as desired. After the composition has been applied it is preferred to remove any solvents that may be present in the applied composition. Preferably the mixture of (A), (B), and (C) has a viscosity such that no solvent is required to aid in the preparation of the composition or in the application of said composition to the substrate.

The applied composition of this invention is cured by exposing at least a portion thereof to energetic radiation for a length of time sufficient to cure the exposed composition and to adhere the exposed composition to the substrate. The cured state of the composition is determined by the Scotch® (registered trademark of 3M Company, Minneapolis, Minnesota) tape test hereinafter described. To be effective as a release coating on a solid substrate the applied, cured compositions of this invention must adhere to the substrate with an adhesive force that is greater than the adhesive force between the cured composition and the adhesive to be released. Preferably the applied, cured composition should pass the rub-off test, hereinafter described. It should be understood that the entire applied composition may be exposed to radiation and cured or only a portion thereof may be exposed and cured and any uncured composition subsequently removed, as desired.

Energetic radiation, for the purposes of this invention, is radiation selected from the group consisting of actinic radiation such a ultraviolet light, X-rays and gamma rays are particulate radiation such as alpha particles and electron beams. The length of time that the compositions of this invention should be exposed to the energetic radiation, in order to cure said composition and to adhere it to the substrate, will depend upon the energy of the radiation and the intensity of the radiation that is incident on the composition. Furthermore, the effectiveness of incident radiation is dependent upon several factors. For example, it is known that low energy electron beams are more effective in an inert atmosphere such as nitrogen, than in air. Of course, it is well known that the intensity of the incident radiation is also inversely proportional to the distance between the energy source and the composition. Whatever form of energetic radiation is used in the method of this invention, the compositions of this invention are exposed to it for a length of time sufficient to cure the composition and to adhere it to the substrate.

Ultraviolet light is a preferred form of energetic radiation for curing the compositions of this invention because of its relative safety, lower cost and lower power requirements. Furthermore, ultraviolet light that contains radiation having a wave length of from approximately 200 to 400 nanometers is highly preferred for the method of this invention because such radiation will cure a composition of this invention, that has been coated on paper, within 1 second, as detailed in the following examples.

The best way known at this time to practice this invention is detailed in the following examples which are provided to further exemplify the invention and are not to be construed as limiting the invention which is properly delineated by the appended claims. All parts are parts by weight and all viscosities are at 25° C. All release data were measured in grams per inch and were converted to N/m for this application by multiplying by 0.3860886 and rounding off. Cure rate was measured in feet per minute and was converted to millimeters per second by multiplying by 5.08.

EXAMPLE 1

Methylmercaptopropyldimethoxy silane was slowly added to a mixture of 97 parts of water and 7 parts of concentrated HCl. The mixture was then heated to 110° C. at atmospheric pressure to distill methanol and to 117° C. at 15 mm of mercury pressure (2 kilopascals) to distill water. The anhydrous residue was neutralized with $NaHCO_3$ and filtered through diatomaceous earth to provide a mixture of cyclic and hydroxy-endblocked polymethylmercaptopropylsiloxanes having a viscosity of approximately 65 millipascal-seconds.

A three-necked resin kettle fitted with a mechanical stirrer, reflux condenser and additional funnel was charged with 43.5 parts of the above polymethylmercaptopropylsiloxane fluid, 4 parts of hexamethyldisiloxane, 456.5 parts of cyclopolydimethylsiloxanes, 0.25 parts of $CF_3SO_3H$ and 0.03 parts of $H_2O$. The mixture was heated at 70° C. for 5.5 hours, neutralized with $Na_2CO_3$, filtered through diatomaceous earth and devolatilized at 150° C. and 0.7 kilopascals pressure. The resulting trimethylsiloxane-endblocked silicone polymer had a viscosity of 1.2 pascal-seconds and contained approximately 2.5 percent mercaptopropyl radicals and 97.5 percent methyl radicals.

Ninety-seven parts of this polymer was mixed with 1.5 parts of benzophenone, as a photosensitizer, at 55° C. The resulting mixture was then cooled and several portions were mixed with various amounts of 1,1'-oxybis(1-methyl-1-silacyclopentene) to give rise to radiation-curable formulations having various ratios of 1-methyl-1-silacyclopentenyl radicals to mercaptopropyl radicals as summarized in Table I, formulations 1 through 6.

Each formulation was coated onto 40 pound supercalendared kraft paper using a trailing blade coater at 15 p.s.i. blade pressure. The coatings were cured for release testing by passing the coated paper at a speed of 100 feet per minute (508 mm/sec.) at a distance of approximately 80 mm from two 20 inch (0.51 m) Hanovia® medium pressure lamps having an input of 200 watts/inch (7.8 kW/m), an output of 1.4 kW/m in the ultraviolet and a U.V. maximum at 366 nm. Since each lamp had a window 7 inches wide this speed resulted in an exposure time of 0.7 seconds. Curing odor was absent from cured formulations 1 through 6. The coatings were considered to be cured if a piece of Scotch® brand adhesive tape would stick to itself after having first been adhered to the coating and then removed and its adhesive surface doubled back on itself. All coatings passed this cure test. The adhesion of each cured formulation to the paper was determined by vigorously rubbing the cured coating with the index finger. Adhesion was deemed preferred if no rub-off occurred. All coatings passed this test for preferred adhesion. Any smear of the coating was also noted during this adhesion test.

Each cured coating was prepared for release testing according to the following procedure. The cured coating was coated with adhesive using either a solution of Monsanto® GMS-263 acrylic adhesive or National Starch® 36-6045 SBR adhesive. The adhesive solution was applied to the cured coating at a wet thickness of 3 mils (76.2 μm) using a drawdown bar. The applied adhesive was air-dried at room temperature for one minute, heated at 65° C. for one minute and then cooled to room temperature again for 1 minute. A sheet of 60 pound matte litho was applied to the dried adhesive and the resulting laminate was pressed through two rolls of an off-set printer and aged for 20 hours at 70° C.

Release testing of the laminates was accomplished by cooling the aged laminates to room temperature, cutting the cooled laminates into 1 inch (25.4 mm) strips and pulling the matte/adhesive lamina from the kraft paper/coating lamina at an angle of 180° ($\pi$ radians) at 400 inches/minute (0.17 m/s). The force, in grams per inch, that was required to separate the laminae was noted. A composition that results in a release value of no more than 38.61 N/m using this test is considered to display premium release.

Table I summarizes the release values (converted from grams/inch to newtons/meter) that were obtained for the several cured formulations.

The cure rate of each formulation was determined by passing coated supercalendared kraft paper at various speeds under the ultraviolet light source described above. The cure rate is the maximum speed at which the coated paper can be passed under the ultraviolet light source and still result in a coating that passes the cure test and adhesion test described above and does not smear when rubbed during the adhesion test. The observed cure rates are also noted in Table I.

A comparison of formulation 7 (prior art composition) and formulation 2 (of this invention) shows that the composition of this invention has a value for cure rate and adhesive release that is comparable to those of the analogous compositions of the art.

TABLE I

| Number | Formulation 1,1'-oxy-bis(1-methyl-1-silacyclopentene) | | Release (N/m) | | Cure Rate (mm./sec.) |
|---|---|---|---|---|---|
| | P.P.H.[1] | C=C/SH[2] | GMS-263 | 36-6045 | |
| 1 | 1.7 | 0.25 | 42.47 | 54.05 | 610 |
| 2 | 3.6 | 0.50 | 38.61 | 46.33 | 610 |
| 3 | 5.3 | 0.77 | 44.40 | 50.19 | 610 |
| 4 | 7.1 | 1.00 | 44.40 | 59.84 | 508 |
| 5 | 9.0 | 1.25 | 46.33[3] | 57.91 | 559 |
| 6 | 14.2 | 2.00 | 48.26[3][4] | 61.77 | 457 |
| 7[5] | 3.0 | 0.50 | 30.89 | 48.26 | 660 |

[1] P.P.H. = parts of 1,1'-oxy-bis(1-methyl-1-silacyclopentene) per 100 parts of the mixture of mercaptopropyl-containing polymer plus benzophenone.
[2] C=C/SH = ratio of 1-methyl-1-silacyclopentenyl radicals to mercaptopropyl radicals.
[3] Detackification of the adhesive.
[4] Release determined on coating cured at 457 mm./sec. instead of 508 mm./sec.
[5] Prior art composition comprising only methylvinylpolysiloxane as curing agent - for comparision purposes only.

EXAMPLE 2

A mixture of 1.5 parts of benzophenone and 100 parts of a trimethylsiloxane-endblocked copolymer containing approximately 5 mol percent of methylmercaptopropyl siloxane units and 95 mol percent dimethylsiloxane units and having a viscosity of approximately 1.2 pascal-seconds was analyzed for mercaptopropyl radicals as follows.

Approximately 1 gram of the mixture weighed to the nearest 0.1 mg., was dissolved in 50 ml. of an 80/20 (volume/volume) mixture of toluene and dimethylsulfoxide and 5 ml. of water was added to the solution. Approximately 6.5 g. of iodine was dissolved in 2 liters of ethanol containing 2 percent benzene and the solution was standardized with standard sodium thiosulfate and found to be 0.053 normal. The solution of sample mixture was titrated with the iodine solution to first permanent yellow color. A volume of 13.35 ml of 0.053N iodine solution was needed to titrate a 1.2247 g sample. Therefore, weight percent SH = 13.35 × 0.053 × 33.06 ÷ 10 ÷ 1.2247 = 1.91 weight percent SH.

A sulfhydryl content of 1.91 weight percent in the mixture of benzophenone plus polydiorganosiloxane denotes a polymer sulfhydryl content of 1.94 weight percent and a polymer methylmercaptopropylsiloxane content of 7.88 weight percent. A trimethylsiloxane-endblocked polydiorganosiloxane containing 7.88 weight percent methylmercaptopropylsiloxane units contains 4.5 mol percent methylmercaptopropylsiloxane units and 95.5 mol percent dimethylsiloxane units, neglecting the terminal methyl radicals of the two terminal trimethylsiloxane endblocking groups, and hence contains 2.25 mol percent mercaptopropyl radicals and 97.75 mol percent methyl radicals.

Several 10.00 part portions of this mixture containing 1.91 weight percent sulfhydryl groups (5.77 millimols of —SH) were mixed with sufficient amounts of either a mixture of cyclopolymethylvinylsiloxanes or 1,1'-oxybis(1-methyl-1-silacyclopentene) or mixtures of the two to provide 0.48 aliphatically unsaturated radicals for every sulfhydryl radical in the mixture. See Table II.

Each composition was coated onto kraft paper and cured at 305, 406, and 508 mm./sec. as in Example 1. All compositions were fully cured at 305 and 406 mm./sec., but not at 508 mm./sec. as determined by the smear test rub-off test and Scotch® brand adhesive tape test described above. Table II also summarizes the extent of curing odor that was noted for each formulation cured at 305 and 406 mm./sec.

TABLE II

| Formulation Number | Cyclopolymethyl-vinylsiloxane P.P.H.[1] | Cyclopolymethyl-vinylsiloxane C=C/SH[2] | 1,1'-oxy-bis(1-methyl-1-silacyclopentene) P.P.H.[1] | 1,1'-oxy-bis(1-methyl-1-silacyclopentene) C=C/SH[2] | Ratio of Vinyl Radicals to 1-Methyl-1-sila-cyclopentenyl Radicals | Curing Odor 406 mm./sec. | Curing Odor 305 mm./sec. |
|---|---|---|---|---|---|---|---|
| 8[3] | 2.5 | 0.48 | — | — | — | strong | strong |
| 9 | 1.8 | 0.36 | 0.7 | 0.12 | 3 | strong | strong |
| 10 | 1.2 | 0.24 | 1.5 | 0.24 | 1 | slight | slight |
| 11 | 0.6 | 0.12 | 2.2 | 0.36 | 0.3 | very slight | very slight |
| 12 | — | — | 3.0 | 0.48 | 0 | very faint | none |

[1] P.P.H. = parts of aliphatically unsaturated component per 100 parts of the mixture of mercaptopropyl-containing polymer plus benzophenone.
[2] C=C/SH = ratio of the number of vinyl or 1-methyl-1-silacyclopentenyl radicals to the number of mercaptopropyl radicals.
[3] Prior art composition - for comparison purposes only.

EXAMPLE 3

A radiation-curable composition was prepared by mixing 18.9 parts of the trimethylsiloxane-endblocked silicone polymer of Example 1, 0.3 parts of benzophenone and 0.7 parts of 1,1'-oxy-bis(1-methyl-1-silacyclopentene). This composition was coated by direct gravure onto 78 pound clay-coated kraft paper and onto 42 pound semibleached kraft paper at a loading of approximately 2 pounds per 3000 square feet (3.25 g/m$^2$). The coating process was carried out on a semi-commercial pilot coater. The coating on the clay-coated kraft paper cured at 457 mm./sec. with two ultraviolet light lamps and at 2032 mm./sec. with four lamps. The coating on the semibleached kraft paper cured at 610 mm./sec. with 4 lamps. Only a very faint curing odor was noted in the vicinity of the ultraviolet light source during this coating and curing process. The cured paper also retained only a very faint odor.

EXAMPLE 4

A radiation-curable composition of this invention was prepared by mixing 97 parts of a trimethylsiloxane-endblocked copolymer of dimethylsiloxane units and methylmercaptopropylsiloxane units and containing approximately 2.7 mol percent mercaptopropyl radicals and the balance methyl radicals, 3 parts of 1,1'-oxy-bis(1-methyl-1-silacyclopentene) and 2 parts of hexachlorobutadiene as a photosensitizer. There was present approximately 0.5 1-methyl-1-silacyclopentenyl radicals for every mercaptopropyl radical in the composition. The composition was coated onto supercalendared kraft paper and cured at 50 feet per minute as in Example 1 to provide an organopolysiloxane coating which did not smear or rub-off the kraft paper or detackify Scotch ® brand adhesive tape.

That which is claimed is:

1. A radiation-curable polydiorganosiloxane composition obtained by mixing components consisting essentially of
   (A) a triorganosiloxane-endblocked polydiorganosiloxane fluid having a viscosity of at least 0.5 pascal-seconds at 25° C., wherein from 50 to 99 percent of all organic radicals are methyl, from 1 to 5 percent of all organic radicals are mercaptoalkyl having the formula —(CH$_2$)$_n$SH, wherein $n$ has a value of from 1 to 4 inclusive, any remaining organic radicals in (A) being phenyl radicals or alkyl radicals having from 2 to 6, inclusive, carbon atoms,
   (B) a polymethylvinylsiloxane, compatible with (A) and having an average of at least three vinyl groups per molecule, and
   (C) 1,1'-oxy-bis(1-methyl-1-silacyclopentene), the amounts of (A), (B), and (C) being sufficient to provide
      (i) a total of from 0.2 to 2.0 silicon-bonded aliphatically-unsaturated radicals for every silicon-bonded mercaptoalkyl radical in the composition, and
      (ii) a molar ratio of silicon-bonded vinyl radicals to 1-methyl-1-silacyclopentenyl radicals of from 0 to 1.0.

2. The composition of claim 1 wherein from 95 to 99 percent of all organic radicals in the triorganosiloxane-endblocked polydiorganosiloxane fluid are methyl radicals, any remaining organic radicals being mercaptoalkyl radicals.

3. The composition of claim 2 wherein $n$ has a value of 3 and the molar ratio of silicon-bonded vinyl radicals to 1-methyl-1-silacyclopentenyl radicals has a value of zero.

4. The composition of claim 3 wherein the triorganosiloxane-endblocked polydiorganosiloxane consists essentially of (CH$_3$)$_3$SiO$_{1/2}$ units, (CH$_3$)$_2$SiO$_{2/2}$ units, and CH$_3$(HSCH$_2$CH$_2$CH$_2$)SiO$_{2/2}$ units.

5. The composition of claim 4 having approximately 0.5 1-methyl-1-silacyclopentenyl radicals for every mercaptopropyl radicals.

6. The composition of claim 5 further containing a photosensitizing amount of a photosensitizing compound.

7. A method of treating a solid substrate to improve the release of adhesive materials therefrom, said method comprising
   (I) applying to the substrate a fluid composition obtained by mixing components consisting essentially of
      (A) a triorganosiloxane-endblocked polydiorganosiloxane fluid having a viscosity of at least 0.5 pascal-seconds at 25° C., wherein from 50 to 99 percent of all organic radicals are methyl, from 1 to 5 percent of all organic radicals are mercaptoalkyl having the formula —(CH$_2$)$_n$SH, wherein $n$ has a value of from 1 to 4 inclusive, any remaining organic radicals in (A) being phenyl radicals or alkyl radicals having from 2 to 6, inclusive, carbon atoms,
      (B) a polymethylvinylsiloxane, compatible with (A) and having an average of at least three vinyl groups per molecule and,
      (C) 1,1'-oxy-bis(1-methyl-1-silacyclopentene), the amount of (A), (B), and (C) being sufficient to provide
         (i) a total of from 0.2 to 2.0 aliphatically unsaturated radicals for every silicon-bonded mercaptoalkyl radicals in the composition, and
         (ii) a molar ratio of silicon-bonded vinyl radicals to 1-methyl-1-silacyclopentenyl radicals of from 0 to 1.0, (II) exposing the applied composition to energetic radiation, thereby curing the applied composition and (III) recovering an article comprising the substrate having adhered thereto a cured polydiorganosiloxane that will provide release of adhesives therefrom.

8. The method of claim 7 wherein the composition further consists of a photosensitizing amount of a photosensitizing compound and the applied composition is exposed to radiation having a wavelength of from 200 to 400 nanometers.

9. The method of claim 8 wherein the triorganosiloxane-endblocked polydiorganosiloxane fluid contains from 95 to 99 percent methyl radicals, any remaining organic radicals being mercaptoalkyl radicals.

10. The method of claim 9 wherein the triorganosiloxane-endblocked polydiorganosiloxane consists essentially of $(CH_3)_3SiO_{1/2}$ units, $(CH_3)_2SiO_{2/2}$ units and $CH_3(HSCH_2CH_2CH_2)SiO_{2/2}$ units and the molar ratio of silicon-bonded vinyl radicals to 1-methyl-1-silacyclopentenyl radicals has a value of zero.

11. The method of claim 10 wherein the fluid composition has approximately 0.5 1-methyl-1-silacyclopentenyl radicals for every mercaptopropyl radical.

12. The method of claim 11 wherein the solid substrate is paper.

13. The article obtained by the method of claim 12.

14. The method of claim 7 wherein the solid substrate is paper.

15. The article obtained by the method of claim 14.

* * * * *

UNITED STATES PATENT AND TRADEMARK OFFICE
CERTIFICATE OF CORRECTION

PATENT NO. : 4,107,390
DATED : August 15, 1978
INVENTOR(S) : David J. Gordon and Maris J. Ziemelis It is certified that error appears in the above-identified patent and that said Letters Patent are hereby corrected as shown below:

In Column 8, line 10; the word reading "or" should read "of".

In Column 8, line 33; the word reading "wellknown" should read "well-known".

In Column 12, line 4; delete the word "Formulation".

In Column 12, line 5; add the word "Formulation" to the first subheading so it will read "Formulation Number".

In Column 12, line 58; the word reading "oxybis(1-methyl-1-silacyclopentene)" should read "oxy-bis(1-methyl-1-silacyclopentene)".

Signed and Sealed this

Sixth Day of October 1981

[SEAL]

Attest:

GERALD J. MOSSINGHOFF

Attesting Officer  Commissioner of Patents and Trademarks